United States Patent
Noda et al.

(10) Patent No.: US 8,057,875 B2
(45) Date of Patent: Nov. 15, 2011

(54) RESIN COMPOSITION FOR TUBES AND TUBE

(75) Inventors: Kenji Noda, Kakogawa (JP); Tsuyoshi Mihayashi, Osaka (JP); Kazumasa Ohara, Settsu (JP)

(73) Assignee: Kaneka Corporation, Osaka (JP)

( * ) Notice: Subject to any disclaimer, the term of this patent is extended or adjusted under 35 U.S.C. 154(b) by 833 days.

(21) Appl. No.: 11/720,511

(22) PCT Filed: Dec. 1, 2005

(86) PCT No.: PCT/JP2005/022118
§ 371 (c)(1),
(2), (4) Date: Apr. 14, 2008

(87) PCT Pub. No.: WO2006/067943
PCT Pub. Date: Jun. 29, 2006

(65) Prior Publication Data
US 2009/0087607 A1    Apr. 2, 2009

(30) Foreign Application Priority Data
Dec. 2, 2004   (JP) .................................. 2004-350276

(51) Int. Cl.
*B29D 22/00*   (2006.01)
*B29D 23/00*   (2006.01)
*B32B 1/08*   (2006.01)

(52) U.S. Cl. .................. 428/36.9; 428/35.7; 428/36.91; 428/36.92; 525/88; 525/99; 525/191; 525/232

(58) Field of Classification Search ............. 428/35.7, 428/36.9, 36.91, 36.92; 525/88, 99, 191, 525/232
See application file for complete search history.

(56) References Cited

U.S. PATENT DOCUMENTS

| 5,895,797 A |   | 4/1999 | Hayashihara et al. ........... 525/95 |
| 6,140,418 A | * | 10/2000 | Yamashita et al. ............... 525/88 |

FOREIGN PATENT DOCUMENTS

| EP | 1 277 822 | 1/2003 |
| JP | 05-310868 | 11/1993 |
| JP | 08-027376 | 1/1996 |
| JP | 10-001579 | 1/1998 |
| JP | 2000-038427 | 2/2000 |
| JP | 2002-178455 | 5/2002 |
| JP | 2002-179906 | 6/2002 |
| JP | 2004-059636 | 2/2004 |

OTHER PUBLICATIONS

Supplementary European Search Report issued by the European Patent Office in counterpart European Application No. 05811757.3, Dec. 16, 2009—7 pages.
Written Opinion of the International Searching Authority for corresponding PCT application No. PCT/JP2005/022118.

* cited by examiner

*Primary Examiner* — Michael C Miggins
(74) *Attorney, Agent, or Firm* — Hamre, Schumann, Mueller & Larson, P.C.

(57) ABSTRACT

The present invention has its object to provide a resin composition for tubes excellent in balance among wear resistance, flexibility, gas permeation resistance and low resilience (pliability). The object is accomplished by a resin composition for tubes which comprises an isobutylene block copolymer (A) constituted of a polymer block (a) derived from isobutylene as a main constituent and a polymer block (b) derived from a monomer component other than isobutylene as a main constituent, and a thermoplastic polyurethane resin (B).

12 Claims, No Drawings

RESIN COMPOSITION FOR TUBES AND TUBE

CROSS-REFERENCE TO THE RELATED APPLICATIONS

This application is a national phase of international application No. PCT/JP2005/022118 field Dec. 1, 2005, the entire contents of which are incorporated by reference. This application also claims benefit of priority under 35 U.S.C. §119 to Japanese Patent Application No. 2004-350276 filed Dec. 2, 2004, the entire contents of which are incorporated by reference.

TECHNICAL FIELD

The present invention relates to a resin composition for tubes and to tubes to be used in liquid transport in the food or medical field.

BACKGROUND ART

Plasticized polyvinyl chloride films have been widely used as materials excellent in transparency, mechanical strength and flexibility in the fields of food packaging, medical devices and instruments and industrial materials, among others. However, plasticized polyvinyl chloride films contain a plasticizer in large amounts and therefore, when used in medical devices or instruments, pose a health problem. Further, they raise such problems as incinerator corrosion when they are burnt for disposal and the generation of dioxins. For such reasons, the demand for materials capable of serving as alternatives to plasticized polyvinyl chloride films in and outside this country. Thermoplastic polyurethane resins, for instance, are materials serving as alternatives to polyvinyl chloride. Thermoplastic polyurethane resins are excellent in such physical properties as rubber elasticity, wear resistance, chemical resistance and low temperature resistance. They are materials excellent in processability since moldings can be readily obtained from them by the conventional methods of molding/processing of thermoplastic resins (Patent Document 1).

However, thermoplastic polyurethane resins are poor in flexibility and, if their flexibility is increased by decreasing the hardness of the resins themselves, the reaction and curing in the stage of synthesis are slow, the tackiness is high and the melting point is low, hence it is difficult to produce the desired resins with great efficiency. Further, the compositions resulting from incorporation of a plasticizer raise such a problem as bleeding out. Furthermore, those resins cannot be said to be excellent in gas permeation resistance, hence cannot be said to be suited for use in the fields of food packaging and medical devices and instruments.

Patent Document 1: Japanese Kokai Publication Hei-08-27376

SUMMARY OF THE INVENTION

It is an object of the present invention to provide a resin composition for tube production with which tubes equivalent in wear resistance to thermoplastic polyurethane resins, excellent in balance among flexibility, air permeation resistance and low resilience (pliability) and further having transparency can be manufactured.

The present inventors made intensive investigations in an attempt to achieve the above object and, as a result, found that a resin composition for tubes which comprises a specific isobutylene block copolymer and a thermoplastic polyurethane resin can provide tubes excellent in such characteristics as mentioned above, namely wear resistance, flexibility, air permeation resistance, low resilience (pliability), thermal stability and weather resistance, among others, and capable of being used in a wide temperature range and, further, that such composition can be recycled with ease. Such findings have led to completion of the present invention.

Thus, the invention relates to
a resin composition for tubes
which comprises an isobutylene block copolymer (A) constituted of a polymer block (a) derived from isobutylene as a main constituent and a polymer block (b) derived from a monomer component other than isobutylene as a main constituent, and a thermoplastic polyurethane resin (B).

In a preferred embodiment,
the above-mentioned resin composition for tubes
wherein the proportion of the isobutylene block copolymer (A) to the thermoplastic polyurethane resin (B), namely (A)/(B), is 10/90 to 90/10 by weight.

The proportion of the isobutylene block copolymer (A) to the thermoplastic polyurethane resin (B), namely (A)/(B), is more preferably 10/90 to 50/50 by weight.

In a preferred embodiment,
the above-mentioned resin composition for tubes
wherein the isobutylene block copolymer (A) has a molecular weight of 50,000 to 200,000 and the polymer block (b) derived from a monomer component other than isobutylene as a main constituent amounts to 10 to 40% by weight of the weight of the isobutylene block copolymer (A).

In a preferred embodiment,
the above-mentioned resin composition for tubes
wherein the monomer component constituting the polymer block (b) is an aromatic vinyl monomer.

In a preferred embodiment,
the above-mentioned resin composition for tubes
wherein the aromatic vinyl monomer is at least one species selected from the group consisting of styrene, p-methylstyrene, α-methylstyrene and indene.

In a preferred embodiment,
the above-mentioned resin composition for tubes
wherein the isobutylene block copolymer (A) is at least one species selected from the group consisting of triblock copolymers composed of the polymer block derived from an aromatic vinyl monomer as a main constituent/a polymer block derived from isobutylene as a main constituent/a polymer block derived from an aromatic vinyl monomer as a main constituent, diblock copolymers composed of the polymer block derived from an aromatic vinyl monomer as a main constituent/a polymer block derived from isobutylene as a main constituent, and star block copolymers having at least three arms comprising a polymer block derived from an aromatic vinyl monomer as a main constituent and a polymer block derived from isobutylene as a main constituent.

In a preferred embodiment,
the above-mentioned resin composition for tubes
which further comprises 1 to 20 parts by weight, per 100 parts by weight of the sum total of the isobutylene block copolymer (A) and thermoplastic polyurethane resin (B), of an olefin polymer or styrene polymer containing at least one functional group species selected from the group consisting of epoxy group, amino group, hydroxyl group, acid anhydride group, carboxyl group, carboxyl acid salt and carboxylic acid ester group, as polymer (C).

In a preferred embodiment,
the above-mentioned resin composition for tubes which further comprises 0.1 to 10 parts by weight, per 100 parts by weight of the sum total of the isobutylene block copolymer (A) and thermoplastic polyurethane resin (B), of a lubricant (D).

In a preferred embodiment, the above-mentioned resin composition for tubes which further comprises 0.1 to 10 parts by weight, per 100 parts by weight of the sum total of the isobutylene block copolymer (A) and thermoplastic polyurethane resin (B), of a processing aid (E).

In another aspect, the present invention relates to a tube made of the above-mentioned resin composition for tubes.

In a further aspect, the invention relates to a transfusion tube made of the above-mentioned resin composition for tubes.

DETAILED DESCRIPTION OF THE INVENTION

In the following, the invention is described in detail.

The resin composition for tubes according to the invention is characterized in that it comprises an isobutylene Block copolymer (A) and a thermoplastic polyurethane resin (B).

The isobutylene block copolymer (A) is a block copolymer containing, in at least part thereof, isobutylene-derived monomer units and, in accordance with the present invention, it is constituted of a polymer block (a) derived from isobutylene as a main constituent and a polymer block (b) derived from a monomer component other than isobutylene as a main constituent.

The polymer block (a) derived from isobutylene as a main constituent mentioned above contains the isobutylene component generally in an amount of at least 60% by weight, preferably at least 80% by weight, with the weight of all the monomer components constituting the polymer block (a) being taken as 100% by weight. The polymer block (a) may contain or may not contain a monomer component other than isobutylene. The monomer component other than isobutylene is not particularly restricted but may be any of such cation-polymerizable monomers as aliphatic olefins, alicyclic olefins, aromatic vinyl compounds, dienes, vinyl ethers, silanes, vinylcarbazole, β-pinene, acenaphthylene and like monomers, which will be described later herein as examples of the monomer components constituting the polymer block (b).

The above-mentioned polymer block (b) derived from a monomer component other than isobutylene as a main constituent contains a monomer component other than isobutylene generally in an amount of at least 60% by weight, preferably at least 80% by weight, with the weight of all the monomer components constituting the polymer block (b) being taken as 100% by weight. As examples of the monomer component constituting the polymer block (b), there may be mentioned aliphatic olefins, alicyclic olefins, aromatic vinyl compounds, dienes, vinyl ethers, silanes, vinylcarbazole, β-pinene, acenaphthylene and like monomers. These may be used singly or two or more of them may be used in combination.

As the aliphatic olefin monomers, there may be mentioned ethylene, propylene, 1-butene, 2-methyl-1-butene, 3-methyl-1-butene, pentene, hexane, 4-methyl-1-pentene and octene, among others.

As the alicyclic olefin monomers, there may be mentioned cyclohexene, vinylcyclohexane and norbornene, among others.

As the aromatic vinyl monomers, there may be mentioned, among others, styrene, o-, m- or p-methylstyrene, α-methylstyrene, β-methylstyrene, 2,6-dimethylstyrene, 2,4-dimethylstyrene, α-methyl-o-methylstyrene, α-methyl-m-methylstyrene, α-methyl-p-methylstyrene, β-methyl-o-methylstyrene, β-methyl-m-methylstyrene, β-methyl-p-methylstyrene, 2,4,6-trimethylstyrene, α-methyl-2,6-dimethylstyrene, α-methyl-2,4-dimethylstyrene, β-methyl-2,6-dimethylstyrene, β-methyl-2,4-dimethylstyrene, o-, m-, or p-chlorostyrene, 2,6-dichlorostyrene, 2,4-dichlorostyrene, α-chloro-o-chlorostyrene, α-chloro-m-chlorostyrene, α-chloro-p-chlorostyrene, β-chloro-o-chlorostyrene, β-chloro-m-chlorostyrene, β-chloro-p-chlorostyrene, 2,4,6-trichlorostyrene, α-chloro-2,6-dichlorostyrene, α-chloro-2,4-dichlorostyrene, β-chloro-2,6-dichlorostyrene, β-chloro-2,4-dichlorostyrene, o-, m-, or p-t-butylstyrene, o-, m-, or p-methoxystyrene, o-, m-, or p-chloromethylstyrene, o-, m-, or p-bromomethylstyrene, silyl-substituted styrene derivatives, indene, vinyl naphthalene and the like.

As the diene monomers, there may be mentioned, among others, butadiene, isoprene, hexadiene, cyclopentadiene, cyclohexadiene, dicyclopentadiene, divinylbenzene, ethylidenenorbornene and the like.

As the vinyl ether monomers, ethers having a vinyl group as well as ethers having a substituted vinyl group such as propenyl group are included and there may be mentioned, among others, methylvinylether, ethylvinylether, (n- or iso) propylvinylether, (n-, sec-, tert-, or iso)butylvinylether, methylpropenylether, ethylpropenylether and the like.

As the silane compounds, there may be mentioned, among others, vinyltrichlorosilane, vinylmethyldichlorosilane, vinyldimethylchlorosilane, vinyldimethylmethoxysilane, vinyltrimethylsilane, divinyldichlorosilane, divinyldimethoxysilane, divinyldimethylsilane, 1,3-divinyl-1,1,3,3-tetramethyldisiloxane, trivinylmethylsilane, γ-methacryloyloxypropyltrimethoxysilane, γ-methacryloyloxypropylmethyldimethoxysilane and the like.

From the viewpoint of balanced physical properties and polymerization characteristics, among others, the use of aromatic vinyl monomers as a main constituent is preferred and, from the mechanical strength viewpoint, the aromatic vinyl monomer content is preferably not lower than 60% by weight, more preferably not lower than 80% by weight, of all the monomer components constituting the polymer block (b). The aromatic vinyl monomer is not particularly restricted but the use of at least one species selected from the group consisting of styrene, α-methylstyrene, p-methylstyrene and indene is preferred and, from the cost viewpoint, the use of styrene, α-methylstyrene or a mixture of these is particularly preferred.

The isobutylene block copolymer (A) is not particularly restricted provided that it is constituted of a polymer block (a) derived from isobutylene as a main constituent and a polymer block (b) derived from a monomer component other than isobutylene as a main constituent, and there may be mentioned, for example, any block copolymers such as block copolymers, diblock copolymers, triblock copolymers, multiblock copolymers and the like having a straight chain, branched chain, star-shaped or other structure. As block copolymers preferred from the balanced physical properties and polymerization characteristics, among others, there may be mentioned, for example, triblock copolymers composed of a polymer block derived from an aromatic vinyl monomer as a main constituent/a polymer block derived from isobutylene as a main constituent/a polymer block derived from an aromatic vinyl monomer as a main constituent, diblock copolymers composed of a polymer block derived from an aromatic vinyl monomer as a main constituent/a polymer block derived from isobutylene as a main constituent, and star-shaped block copolymers having at least three arms each composed of a polymer block derived from an aromatic vinyl monomer as a main constituent and a polymer block derived from isobutylene as a main constituent. It is possible to use these either singly or in combination of two or more species so that the desired physical properties and moldability/processability may be obtained. Among them, the triblock copolymers and diblock copolymers mentioned above are preferred, and styrene-isobutylene-styrene triblock copolymers (SIBS) or styrene-isobutylene diblock copolymers, in which styrene is used as the aromatic vinyl monomer, are more preferred.

The proportion of the polymer block (a) to the polymer block (b) is not particularly restricted but, from the viewpoint of balanced physical properties, the amount of the polymer block (a) is preferably 90 to 60% by weight per 100% by weight of the sum total of the polymer block (a) and polymer block (b). On the other hand, the amount of the polymer block (b) is preferably 10 to 40% by weight. When the proportion of the polymer block (b) is lower than 10% by weight, the mechanical properties are expressed only to an unsatisfactory extent and, when it exceeds 40% by weight, the isobutylene-due air permeation resistance (gas barrier property) unfavorably decreases. The proportion of the polymer block (b) is more preferably 15 to 35% by weight, still more preferably 20 to 30% by weight, per 100% by weight of the sum total of the polymer block (a) and polymer block (b).

The molecular weight of the isobutylene block copolymer (A) is not particularly restricted but, from the viewpoint of flowability, processability and physical properties, among others, the weight average molecular weight is preferably 30,000 to 500,000, more preferably 50,000 to 200,000, still more preferably 50,000 to 150,000. When the weight average molecular weight of the isobutylene block copolymer is lower than 30,000, there is a tendency toward tackiness (feel of tack) and softening agent bleeding out and, in addition, the mechanical properties are not expressed to a sufficient extent. When, on the other hand, it exceeds 500,000, disadvantages will be experienced from the flowability and processability viewpoint. The weight average molecular weight mentioned above can be determined on the polystyrene equivalent basis by using a Water's gel permeation chromatography (GPC) system (column: Showa Denko's Shodex K-804 (polystyrene gel), mobile phase; chloroform), for instance.

The method of producing the isobutylene block copolymer is not particularly restricted but the copolymer can be obtained, for example, by polymerizing a monomer component derived from isobutylene as a main constituent and a monomer component derived from a monomer other than isobutylene as a main constituent in the presence of a compound represented by the general formula (1):

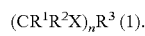

$(CR^1R^2X)_nR^3$ (1).

[In the above formula, X is a substituent selected from among halogen atoms and alkoxy or acyloxy groups containing 1 to 6 carbon atoms (preferably 1 to 3 carbon atoms). $R^1$ and $R^2$ each independently is a hydrogen atom or a monovalent hydrocarbon group containing 1 to 6 carbon atoms (preferably 1 to 3 carbon atoms). $R^1$ and $R^2$ may be the same or different. $R^3$ is a mono- to hexavalent aromatic or alicyclic hydrocarbon group or a mono- to tetravalent aliphatic hydrocarbon group, and n represents a natural number of 1 to 6 when the $R^3$ group is an aromatic or alicyclic hydrocarbon group and, when the $R^3$ group is an aliphatic group, n represents a natural number of 1 to 4.]

The compound represented by the general formula (1) serves as an initiator and presumably forms a carbocation in the presence of a Lewis acid or the like, which serves as an initiation site for cationic polymerization. Among them, compounds wherein $R^3$ group in the above-mentioned general formula (1) is a mono- to trivalent aromatic hydrocarbon group are preferred.

As examples of the compound of general formula (A) to be used in the practice of the invention, there may be mentioned, among others, such compounds as (1-chloro-1-methylethyl)benzene [$C_6H_5C(CH_3)_2Cl$], 1,4-bis(1-chloro-1-methylethyl)benzene [$1,4\text{-}Cl(CH_3)_2CC_6H_4C(CH_3)_2Cl$], 1,3-bis(1-chloro-1-methylethyl)benzene [$1,3\text{-}Cl(CH_3)_2CC_6H_4C(CH_3)_2Cl$], 1,3,5-tris(1-chloro-1-methylethyl)benzene [$1,3,5\text{-}(ClC(CH_3)_2)_3C_6H_3$] and 1,3-bis(1-chloro-1-methylethyl)-5-(tert-butyl)benzene [$1,3\text{-}(C(CH_3)_2Cl)_2\text{-}5\text{-}(C(CH_3)_3)C_6H_3$].

Among these, bis(1-chloro-1-methylethyl)benzene [$C_6H_4(C(CH_3)_2Cl)_2$] and tris(1-chloro-1-methylethyl)benzene [$(ClC(CH_3)_2)_3C_6H_3$] are particularly preferred. Bis(1-chloro-1-methylethyl) benzene is a compound which is also called bis(α-chloroisopropyl)benzene, bis(2-chloro-2-propyl)benzene or dicumyl chloride, and tris(1-chloro-1-methylethyl)benzene is a compound which is also called tris(α-chloroisopropyl)benzene, tris(2-chloro-2-propyl)benzene or tricumyl chloride.

On the occasion of the polymerization of the isobutylene block copolymer (A), a Lewis acid catalyst may further be caused to coexist. Such Lewis acid catalyst may be any of those which can be used in cationic polymerization; thus, metal halides such as $TiCl_4$, $TiBr_4$, $BCl_3$, $BF_3$, $BF_3.OEt_2$, $SnCl_4$, $SbCl_5$, $SbF_5$, $WCl_6$, $TaCl_5$, $VCl_5$, $FeCl_3$, $ZnBr_2$, $AlCl_3$ and $AlBr_3$; and organometal halides such as $Et_2AlCl$ and $EtAlCl_2$ can be suitably used. Among them, $TiCl_4$, $BCl_3$ and $SnCl_4$ are preferred in view of their ability as catalysts and their ready commercial availability. The addition amount of the Lewis acid is not particularly restricted but can be selected according to the polymerization characteristics of the monomers employed and/or the polymerization concentration, among others. Generally, the Lewis acid can be used at amounts of 0.1 to 100 mole equivalents, preferably 1 to 50 mole equivalents, relative to 1 mole of the compound represented by the general formula (1).

In polymerizing the isobutylene block copolymer (A), an electron donor component may further be used according to need. This electron donor component is considered to be effective in stabilizing the growing carbocations on the occasion of cationic polymerization and, when such an electron donor is added, a structurally controlled polymer with a narrow molecular weight distribution is formed. The electron donor component to be used is not particularly restricted but includes, for example, pyridines, amines, amides, sulfoxides, esters, and metal compound containing a metal atom-bound oxygen atom(s), among others.

The polymerization for producing the isobutylene block copolymer (A) can be generally carried out in an organic solvent. The organic solvent is not particular restricted provided that it will not essentially disturb the cationic polymerization. As specific example of the organic solvents, there may be mentioned, among others, halogenated hydrocarbons such as methyl chloride, dichloromethane, chloroform, ethyl chloride, dichloroethane, n-propyl chloride, n-butyl chloride and chlorobenzene; benzene and alkylbenzenes such as toluene, xylene, ethylbenzene, propylbenzene and butylbenzene; straight chain aliphatic hydrocarbons such as ethane, propane, butane, pentane, hexane, heptane, octane, nonane and decane; branched aliphatic hydrocarbons such as 2-methylpropane, 2-methylbutane, 2,3,3-trimethylpentane and 2,2,5-trimethylhexane; cyclic aliphatic hydrocarbons such as cyclohexane, methylcyclohexane and ethylcyclohexane; and paraffin oils derived from petroleum fractions by purification by hydrogenation.

These solvents may be used either singly or in combination of two or more of them considering, from the balance viewpoint, the polymerization characteristics of the monomers to constitute the block copolymer and the solubility and other properties of the polymer to be formed.

Considering the viscosity of the polymer solution to be obtained and the ease in removing heat, the amount of the solvent to be used is not particularly restricted and determined so that the polymer concentration in the reaction solution may amount to preferably 1 to 50% by weight, more preferably 5 to 35% by weight, per 100% by weight of the sum total of the reaction solution.

In actually carrying out the polymerization, the respective components may be mixed up with cooling, for example, at a temperature not lower than −100° C. but lower than 0° C. A particularly preferred temperature range for the energy cost against the stability of polymerization is −30° C. to −80° C.

The thermoplastic polyurethane resin (B) is now described.

As the thermoplastic polyurethane resin (B), there may be mentioned, among others, thermoplastic polyurethane resins obtained by polymerization of (i) an organic diisocyanate, (ii) a chain extender and (iii) a polymer polyol, for example thermoplastic polyurethane resins represented by such a structural formula as the general formula (2):

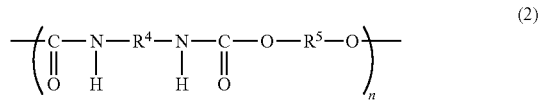

(2)

[In the above formula, $R^4$ and $R^5$ groups each independently represents a divalent aliphatic hydrocarbon group containing 1 to 10 carbon atoms (preferably 1 to 6 carbon atoms), a divalent aliphatic hydrocarbon group containing 1 to 10 carbon atoms (preferably 1 to 6 carbon atoms) or a divalent aromatic hydrocarbon group containing 1 to 20 carbon atoms (preferably 1 to 10 carbon atoms) and each may be unsubstituted or substituted. When the $R^4$ or $R^5$ group is a substituted or unsubstituted phenylene group, the two sites of bonding to N or O may be ortho, meta or para to each other. The symbol n represents an arbitrary natural number, preferably 10 to 5,000, more preferably 20 to 1,000.

Depending on the polyol species used, the thermoplastic polyurethane resins are classified into ester type, ether type and carbonate type ones, among others. For example, ester type thermoplastic polyurethane resins are ones obtained by using a polyester diol as the polymer polyol and, as examples thereof, there may be mentioned dicarboxylic acid ester type ones obtained by using, as the polymer polyol, a polycondensate derived from a diol and a dicarboxylic acid, and lactone type ones obtained by using a polylactone diol. Similarly, ether type thermoplastic polyurethane resins are ones obtained by using a polyether diol as the polymer polyol, and carbonate type thermoplastic polyurethane resins are ones obtained by using a polycarbonate diol as the polymer polyol. The thermoplastic polyurethane resin to be used as the thermoplastic polyurethane resin (B) in accordance with the invention is not particularly restricted but use may be made of the above-mentioned various types of thermoplastic polyurethane resins. As suitable examples of the thermoplastic polyurethane resins, there may be mentioned, for example, Pandex (product name, product of DIC Bayer Japan), Miractran (product name, product of Nippon Polyurethane Industry), Elastran (product name, product of BASF Japan Ltd.), Tecothane (product name, product of Noveon, Inc.), Tecoflex (product name, product of Noveon, Inc.) and like commercially available thermoplastic polyurethane resins.

The thermoplastic polyurethane resin (B) may be produced by any of the methods utilizing the prior art technologies. For example, the above-mentioned thermoplastic polyurethane resin (B) can be obtained by the method comprising mixing the component (i) and component (ii) blended together in advance with the component (iii) by high-speed stirring and casting the resulting mixture onto a vat treated beforehand for mold release, if necessary followed by heating at a temperature not higher than 200° C., to allow the reaction to proceed, or by the method, comprising mixing up the component (i) and component (ii) to give an isocyanato-terminated prepolymer, adding the component (iii) thereto and stirring the resulting mixture at a high speed and casting the mixture onto a vat treated beforehand for mold release, if necessary followed by heating at a temperature not higher than 200° C., to allow the reaction to proceed.

The organic diisocyanate (i) to be suitably used may be any of those known in the art, for example hexamethylene diisocyanate, lysine diisocyanate, isophoronediisocyanate, xylenediisocyanate, cyclohexanediisocyanate, toluidinediisocyanate, 2,4-tolylene diisocyanate, 2,6-tolylene diisocyanate, 4,4'-diphenylmethanediisocyanate, p-phenylene diisocyanate, m-phenylene diisocyanate and 1,5-naphthalenediisocyanate. Such organic diisocyanates may be used singly or two or more of them may be used in combination.

Preferably used as the chain extender (ii) are dihydroxy compounds having a molecular weight lower than 500. As such, there may be mentioned, for example, ethylene glycol, 1,2-propylene glycol, 1,3-propylene glycol, 2,3-butylene glycol, 1,4-butanediol, 2,2'-dimethyl-1,3-propanediol, diethylene glycol, 1,5-pentanediol, 1,6-hexanediol, cyclohexane-1,4-diol and cyclohexane-1,4-dimethanol. Such chain extenders as mentioned above may be used singly or two or more of them may be used in combination.

Preferable used as the polymer polyol (iii) are dihydroxy compounds having an average molecular weight of 500 to 4,000. As such, there may be mentioned, for example, polyester diols, polyether diols and polycarbonate diols. As the polyester diols, there may be mentioned polycondensates derived from one or more species selected from among ethylene glycol, propylene glycol, 1,4-butanediol, 1,5-pentanediol, 1,6-hexanediol, neopentyl glycol, 3-methyl-1,5-pentanediol, cyclohexanedimethanol and like other low-molecular diol components and one or more species selected from among adipic acid, glutaric acid, suberic acid, sebacic acid, terephthalic acid, isophthalic acid and like low-molecular dicarboxylic acids, and polylactone diols obtained by ring-opening polymerization of lactones, for example polypropiolactone diol, polycaprolactone diol and polyvalerolactone diol. As the polyether diols, there may be mentioned polypropylene ether glycol, polytetramethylene ether glycol, polyhexamethylene ether glycol and other copolymer polyether glycols. As the polycarbonate diols, there may be mentioned, among others, polyhexamethylene carbonate diol, diols derived from polyhexamethylene carbonate diol by ring-opening addition polymerization of lactones, and co-condensation products derived from polyhexamethylene carbonate diol and another polyester diol, polyether diol or poly-ether-ester diol.

The proportion of the isobutylene block copolymer (A) to the thermoplastic polyurethane resin (B) is preferably a weight ratio of (A)/(B)=10/90 to 90/10, more preferably 10/90 to 50/50. When the proportion of the (A) component is lower than 10% by weight, the flexibility- and gas permeation resistance-improving effects tend to be unsatisfactory and, when it exceeds 90% by weight, the wear resistance intrinsic in the thermoplastic polyurethane resin tends to be impaired. More preferably, the above weight ratio is 10/90 to 40/60.

The resin composition for tubes according to the invention may further comprise a polymer (C) in addition to the isobutylene block copolymer (A) and thermoplastic polyurethane resin (B). The polymer (C) to be used in the practice of the invention is an olefinic polymer or styrenic polymer containing at least one functional group species selected from the group consisting of epoxy group, amino group, hydroxyl group, acid anhydride group, carboxyl group, carboxyl acid salt and carboxylic acid ester group. The polymer so referred to herein includes copolymers. In the case of a copolymer, the mode of copolymerization is not particularly restricted but may be of any form of copolymer such as a random copolymer, graft copolymer or block copolymer.

The olefinic polymer so referred to herein is a polymer containing olefin monomer units in the main chain skeleton thereof, and the styrenic polymer is a polymer containing styrene or substituted styrene derivative monomer units in the main chain skeleton thereof. As examples of such olefinic polymer and styrenic polymer, there may be mentioned ethylene-α-olefin copolymers such as ethylene-propylene copolymers, ethylene-butene copolymers, ethylene-octene copolymers and ethylene-hexene copolymers; polyethylene, polypropylene, polystyrene, polybutene, ethylene-propylene-diene copolymers, styrene-butadiene copolymers, styrene-butadiene-styrene block copolymers (SBS), styrene-isoprene-styrene block copolymers (SIS), polybutadiene, butadiene-acrylonitrile copolymers, polyisoprene, butene-isoprene copolymers, styrene-ethylene/butylene-styrene block copolymers (SEBS) and styrene-ethylene/propylene-styrene block copolymers (SEPS), among others.

The polymer (C) containing at least one functional group species selected from the group consisting of epoxy group, amino group, hydroxyl group, acid anhydride group, carboxyl group, carboxyl acid salt and carboxylic acid ester group can be obtained by subjecting a functional group-containing monomer to copolymerization on the occasion of preparing the above-mentioned olefinic polymer or styrenic polymer. As typical examples of the functional group-containing polymer (C) there may be mentioned products of copolymerization of an acid anhydride such as maleic anhydride, succinic anhydride or fumaric anhydride with polyolefin polymers such as ethylene-α-olefin copolymers, and olefinic polymers or styrenic polymers resulting from copolymerization of a carboxylic acid such as acrylic acid, methacrylic acid or vinyl acetate or a salt thereof such as the Na, Zn, K, Ca or Mg salt, or a carboxylic acid ester such as methyl acrylate, methyl methacrylate, ethyl acrylate, ethyl methacrylate, propyl acrylate, propyl methacrylate, butyl acrylate or butyl methacrylate, among others.

More specific examples are ethylene-methyl acrylate copolymers, ethylene-ethyl acrylate copolymers, ethylene-n-propyl acrylate copolymers, ethylene-isopropyl acrylate copolymers, ethylene-n-butyl acrylate copolymers, ethylene-tert-butyl acrylate copolymers, ethylene-isobutyl acrylate copolymers, ethylene-methyl methacrylate copolymers, ethylene-ethyl methacrylate copolymers, ethylene-n-propyl methacrylate copolymers, ethylene-isopropyl methacrylate copolymers, ethylene-n-butyl methacrylate copolymers, ethylene-tert-butyl methacrylate copolymers, ethylene-isobutyl methacrylate copolymers, ethylene-(meth) acrylic acid copolymers and metal salts thereof such as the Na, Zn, K, Ca or Mg salts, ethylene-maleic anhydride copolymers, ethylene-butene-maleic anhydride copolymers, ethylene-propylene-maleic anhydride copolymers, ethylene-hexene-maleic anhydride copolymers, ethylene-octene-maleic anhydride copolymers, propylene-maleic anhydride copolymers, maleic anhydride-modified SBS, maleic anhydride-modified SIS, maleic anhydride-modified SEBS, maleic anhydride-modified SEPS, and maleic anhydride-modified ethylene-ethyl acrylate copolymers, among others. These may be used singly or two or more of them may be used in combination.

Among these, acid anhydride group-containing styrene-ethylene/butylene-styrene copolymers (maleic anhydride-modified SEBS) are preferred from the viewpoint of transparency of the resin composition for tubes.

The resin composition for tubes according to the invention preferably contains 0.1 to 50 parts by weight, more preferably 1 to 20 parts by weight, of the polymer (C) per 100 parts by weight of the sum total of the isobutylene block copolymer (A) and thermoplastic polyurethane resin (B). When the amount of the polymer (C) is smaller than 0.1 part by weight, the compatibilizing effect will be insufficient and, at amounts exceeding 50 parts by weight, the proportion of the (A) component in the composition decreases accordingly and the flexibility, gas permeation resistance and low resilience tend to be impaired. A more preferred amount of (C) is 1 to 10 parts by weight, particularly preferably 2 to 7 parts by weight.

The polymer (C) may be added to the isobutylene block copolymer (A) and thermoplastic polyurethane resin (B) on the occasion of melt kneading thereof or may be added in advance to the isobutylene block copolymer (A) and thermoplastic polyurethane resin (B). Preliminary addition to the isobutylene block copolymer (A) and thermoplastic polyurethane resin (B) is preferred since the compatibility-improving effect can then be readily produced.

If necessary, a lubricant may be added as component (D) to the resin composition for tubes according to the invention. The lubricant is not particularly restricted but is preferably a fatty acid metal salt type lubricant, fatty acid amide type lubricant, fatty acid ester type lubricant, fatty acid type lubricant, aliphatic alcohol type lubricant, fatty acid-polyhydric alcohol partial ester, paraffin type lubricant or the like. These may be used singly or in combination of two or more.

The fatty acid metal salt type lubricant includes calcium stearate, magnesium stearate, aluminum stearate, zinc stearate, barium stearate and metal montanates, among others.

The fatty acid amide type lubricant includes ethylenebisstearamide, ercamide, oleamide, stearamide, behenamide, ethylenebisoleamide, ethylenebisercamide, ethylenebislauramide, m-xylylenebisstearamide and p-phenylenebisstearamide, among others.

The fatty acid ester type lubricant includes methyl laurate, methyl myristate, methyl palmitate, methyl stearate, methyl oleate, methyl ercate, methyl behenate, butyl laurate, butyl stearate, isopropyl myristate, isopropyl palmitate, octyl palmitate, coco fatty acid octyl ester, octyl stearate, special beef tallow fatty acid octyl ester, lauryl laurate, stearyl stearate, behenyl behenate, cetyl myristate, hardened beef tallow oil, hardened castor oil and montanic acid esters, among others.

The fatty acid type lubricant includes stearic acid, palmitic acid, oleic acid, linolic acid, linolenic acid and montanic acid, among others.

The aliphatic alcohol type lubricant includes stearyl alcohol, cetyl alcohol, myristyl alcohol and lauryl alcohol, among others.

The fatty acid-polyhydric alcohol partial ester includes stearic acid monoglyceride, stearic acid diglyceride, oleic acid monoglyceride and partially hydrolyzed montanic acid esters, among others.

The paraffin type lubricant includes paraffin waxes, liquid paraffins, polyethylene wax, oxidized polyethylene wax and polypropylene wax, among others.

Preferred as the lubricant (D) among these are fatty acid amide type lubricants, fatty acid ester type lubricants and paraffin type lubricants in view of the balance between moldability-improving effect and cost. As typical examples of such preferred lubricants, there may be mentioned Licolub H4 (product name, modified hydrocarbon (paraffin) type lubricant, product of Clariant Japan) and like commercial products.

The lubricant (D) is preferably used at addition amounts of 0.1 to 10 parts by weight per 100 parts by weight of the sum total of the isobutylene block copolymer (A) and thermoplastic polyurethane resin (B). At amounts lower than 0.1 part by weight, insufficient levels of lubricity relative to the metal surface will result and the processability and surface properties tend to deteriorate due to sticking and, at addition amounts exceeding 10 parts by weight, inadequate mixing may result and the (D) component tends to separate out. A more preferred addition amount is 0.1 to 5 parts by weight, still more preferably 0.1 to 2 parts by weight, particularly preferably 0.1 to 1 part by weight.

Furthermore, a processing aid (E) may be added to the resin composition for tubes according to the invention. The processing aid (E) serves for the purpose of improving the melt viscosity of the composition and improves the moldability in the step of molding/processing. Specifically, it includes inorganic processability improvers, acrylic polymer-based processability improvers and polytetrafluoroethylene-based processability improvers, among others and, as polytetrafluoroethylene-based improvers, there may be mentioned Mitsubishi Rayon's Metablen (registered trademark) A3000 and Asahi Glass's Lumiflon (registered trademark), for instance.

The addition amount of the processing aid is not particularly restricted but is preferably 0.1 to 10 parts by weight per 100 parts by weight of the sum total of the isobutylene block copolymer (A) and thermoplastic polyurethane resin (B). At amounts lower than 0.1 part by weight, the processability-improving effects will often be insufficient and, at amounts exceeding 10% by weight, the melt tension tends to become excessively high, resulting in poor processability in molding. A more preferred addition amount is 0.1 to 5 parts by weight, more preferably 0.1 to 2.5 parts by weight.

If necessary, a polyolefin resin may also be added to the resin composition for tubes according to the invention to provide the same with flowability in molding. The polyolefin resin may comprise one or a combination of two or more of α-olefin homopolymers, random copolymers and block copolymers, mixtures thereof, α-olefin- and other unsaturated monomer-derived random copolymers, block copolymers and graft copolymers, and oxidized, halogenated or sulfonated modifications of these, among others. Specific examples are polyethylene type resins such as polyethylene, ethylene-propylene copolymers, ethylene-propylene-nonconjugated diene copolymers, ethylene-butene copolymers, ethylene-hexene copolymers, ethylene-octene copolymers, ethylene-vinyl acetate copolymers, ethylene-vinyl alcohol copolymers, ethylene-ethyl acrylate copolymers, ethylene-acrylic acid copolymers, ethylene-methyl acrylate-maleic anhydride copolymers and chlorinated polyethylene, polypropylene type copolymers such as polypropylene, propylene-ethylene random copolymers, propylene-ethylene block copolymers and chlorinated polypropylene, polybutene, polyisobutylene, polymethylpentene and cyclic olefin (copolymers, among others. Among these, polyethylene, polypropylene and mixtures of these may be preferably used from the viewpoint of cost and balanced physical properties of the thermoplastic resin. The addition amount of the polyolefin resin is preferably 0 to 100 parts by weight, more preferably 0 to 50 parts by weight, still more preferably 0 to 30 parts by weight, per 100 parts by weight of the sum total of the isobutylene block copolymer (A) and thermoplastic polyurethane resin (B). At amounts exceeding 100 parts by weight, the hardness tends to become high.

If necessary, a softening agent may also be added to the resin composition for tubes according to the invention. The softening agent to be used is not particularly restricted but generally and suitably is a liquid or a material which is liquid at room temperature. The softening agent may be either hydrophilic or hydrophobic. As such softening agent, there may be mentioned various mineral oil-derived, vegetable oil-derived or synthetic softening agents for rubbers and resins. Examples of the mineral oil-derived ones are naphthene- or paraffin-based process oils, among others, examples of the vegetable oil-derived ones are castor oil, cotton seed oil, linseed oil, rapeseed oil, soybean oil, palm oil, coconut oil, peanut oil, Japan wax, pine oil, olive oil and the like, and examples of the synthetic ones are polybutene and low-molecular-weight polybutadiene and so forth. Among these, paraffin-based process oils and polybutene are preferably used from the viewpoint of compatibility with the isobutylene block copolymer (A) or balanced physical properties of the resin composition for tubes. These softening agents may be used singly or in appropriate combination of two or more species for obtaining the desired levels of viscosity and physical properties.

The addition amount of the softening agent is preferably 0 to 100 parts by weight, more preferably 0 to 50 parts by weight, still more preferably 0 to 30 parts by weight, per 100 parts by weight of the sum total of the isobutylene block copolymer (A) and thermoplastic polyurethane resin (B). At amounts exceeding 100 parts by weight, the softening agent unfavorably tends to bleed out.

Furthermore, one or more of various fillers can be incorporated in the resin composition for tubes according to the invention for bringing about improvements in physical properties and/or for reasons of economic merit. As appropriate fillers, there may be mentioned, for example, clay, diatomaceous earth, silica, talc, barium sulfate, calcium carbonate, magnesium carbonate, metal oxides, mica, graphite, aluminum hydroxide and like scaly inorganic fillers, various metal powders, wood chips, glass powders, ceramics powders, carbon black, granular or particulate polymer and like granular or particulate solid fillers, various other natural or artificial short fibers and long or continuous fibers, among others. Further, by incorporating hollow fillers, such as glass balloons, silica balloons or like inorganic hollow fillers or polyvinylidene fluoride- or polyvinylidene fluoride copolymer-based organic hollow fillers, it becomes possible to attain weight reduction. Furthermore, for reduction in weight and improvements in shock-absorbing properties and other various physical properties, it is also possible to incorporate any of various blowing agents or mechanically admixing a gas with the composition on the occasion of blending thereof.

The addition amount of the filler is preferably 0 to 100 parts by weight, more preferably 0 to 50 parts by weight, still more preferably 0 to 30 parts by weight, per 100 parts by weight of the sum total of the isobutylene block copolymer (A) and thermoplastic polyurethane resin (B). At amounts exceeding 100 parts by weight, the mechanical strength of the resulting resin composition for tubes tends to decrease and, unfavorably, the flexibility also tends to be impaired.

An antioxidant and/or an ultraviolet absorber may further be incorporated in the resin composition for tubes according to the invention according to need. The addition amount thereof is preferably 0.01 to 10 parts by weight, more preferably 0.01 to 5 parts by weight, per 100 parts by weight of the thermoplastic resin.

Furthermore, one or a combination of two or more of other additives such as flame retardants, antimicrobial agents, light stabilizers, colorants, flow modifiers, antiblocking agents, antistatic agents, crosslinking agents and crosslinking aids may be added to the resin composition.

One or more of various thermoplastic resins, thermosetting resins, other thermoplastic elastomers and the like may further be added to the resin composition for tubes according to the invention at amounts at which the performance characteristics of the composition will not be impaired.

The method of producing the resin composition for tubes according to the invention is not particularly restricted but any of the methods known in the art can be applied. For example, the composition can be produced by melt kneading the respective components mentioned above, if desired together with an additive component(s), using a hot kneading machine, for example a single-screw extruder, twin-screw extruder, roll, Banbury mixer, Brabender mixer, kneader or high-shear mixer.

The order of kneading of the respective components is not particularly restricted but can be determined according to the apparatus used and the workability and/or physical properties of the resin composition for tubes to be obtained.

The tube and transfusion tube, which are made of the above-mentioned resin composition for tubes and constitute another aspect of the invention, are now described.

The tube made of the above-mentioned resin composition for tubes may be a single layer tube made of one base material or a multilayered tube resulting from lamination of a plurality of layers each made of the above-mentioned resin composition for tube differing in composition or from lamination of a plurality of a layer or layers made of the above-mentioned resin composition for tubes and a layer or layers made of another resin composition. For example, in the case of the tube of the invention being a transfusion tube, the tube may be a single layer tube made of the above-mentioned resin composition for tubes or a tube comprising a layer made of the above-mentioned resin composition for tubes as the main layer or center layer.

For example, it is possible to provide the upper layer and/or lower layer made of the resin composition for tubes with another layer such as a coating layer (covering layer), an antistatic layer or a layer made of another resin composition. By forming a coating layer on the outside surface of the tube, it becomes possible to cause the characteristics thereof as a coating layer, for example gas barrier properties (e.g. oxygen barrier and/or water vapor barrier properties), light-shielding, antiblocking, antislipping and γ ray-shielding properties and thermal stability to successfully manifest themselves and thus produce a tube having the feel of a polyvinyl chloride tube and further improve the characteristics of the tube. The tube surface (inside surface and/or outside surface) may be processed in various ways, for example for embossing, or surface-treated in various ways, for example by acid treatment.

The tube can be produced, for example, by extrusion molding. The resin composition for tubes as obtained by such a production method as mentioned above is fed to an extruder. Then, the desired tube can be obtained by extrusion through a die, followed by cooling with water. By using the isobutylene block copolymer (A) and thermoplastic polyurethane resin (B) and further adjusting the third component(s) such as the polymer (C) (e.g. functional group-containing styrenic polymer), lubricant (D) and/or processing aid (E), it is possible to obtain transparent tubes. Furthermore, various tubes, transfusion tubes and the like can be obtained by processing those tubes.

The tube of the invention is made of a mixture (blend) composed of the isobutylene block copolymer (A) and thermoplastic polyurethane resin (B), if necessary together with the polymer (C), lubricant (D) and/or processing aid (E), among others, and has excellent flexibility. More specifically, while it maintains the wear resistance intrinsic in the thermoplastic polyurethane resin, it has good flexibility and kink resistance equivalent to those of PVC. It shows good layer recovery; after squashing, the original shape or configuration is immediately recovered. It has such levels of transparency, flexibility and low resilience (pliability) as required for use as a transfusion tube for medical use.

EFFECTS OF THE INVENTION

As described hereinabove, the resin composition for tubes according to the invention is excellent in balance among wear resistance, flexibility (low hardness or rigidity), gas permeation resistance, low resilience (pliability) and weather resistance. Furthermore, the resin can be rendered transparent. Therefore, it can be utilized in the fields of general manufacturing industries, automobile industry, medical and pharmaceutical industries and food industry. In particular, it can be properly used as a base material for food-transporting tubes, tubes for medical use or containers for medical use, which are required to have the flexibility (low hardness or rigidity), gas permeation resistance and transparency of a flexible resin layer. It is also very useful as an alternative material for thermoplastic polyurethane resins to serve as alternative materials for PVC and as an alternative material for plasticized polyvinyl chloride.

The tubes made of the resin composition for tubes according to the invention can be suitably used as tubes for medical use (e.g. transfusion tubes, catheters) and in the form of containers for medical use (e.g. blood bags).

BEST MODES FOR CARRYING OUT THE INVENTION

In the following, the invention is described in further detail. The examples given below are, however, by no means limitative of the scope of the invention. Various modifications can be made without departing from the gist of the invention.

Prior to describing examples, various measurement methods and evaluation methods are first described.

(Tube Moldability)

A conical twin-screw extruder (product of Toyo Seiki) was used with the temperature in the vicinity of the hopper of the extruder adjusted to 160° C., that of the intermediate portion to 220° C. and that of the tip end to 230° C. The respective components of the composition for tubes were fed through the hopper opening thereof, and a resin composition for tubes with an inside diameter of 5 mm and an outside diameter of 8 mm was obtained from a tube die attached to the tip; the screw speed was 100 rpm. The appearance of this tube was evaluated by visual observation. The take-off characteristics (tube breaking, shape retention, etc.) were evaluated in the following five grades.

Excellent: Good;
Fine: Rather good;
Fair: Ordinary;
Less good: Rather poor;
Poor: Poor.
(Measurements of Various Physical Properties of Resin Composition for Tubes)

The molecular weight of each isobutylene block copolymer (A) and the physical properties of each resin composition for tubes composed of an isobutylene block copolymer (A) and a thermoplastic polyurethane resin (B) were measured by the methods given below.

(1) Hardness

Three 2-mm-thick pressed sheets were produced from each resin composition for tubes and placed one on top of another and the assembly was subjected to hardness measurement according to JIS K 6352. The numerical values given later herein in Table 1 are the values 15 seconds after the start of the measurement.

(2) Tensile Strength and Tensile Elongation

A 2.0-mm-thick pressed sheet was produced from each resin composition for tubes, and dumbbell No. 3 test specimens were punched out of the sheet and subjected to tensile strength and tensile elongation testing according to JIS K 6251 (methods of tensile testing of vulcanized rubbers) under the conditions of 23° C. and 500 mm/minute. The apparatus used was a model AG-10TB autograph (product of Shimadzu Corporation).

(3) Transparency

A 2.0-mm-thick pressed sheet was produced from each resin composition for tubes by compression molding at 170° C. The transparency of the pressed sheet obtained was judged by visual observation according to the criteria given below.
Fine: Feel of transparency;
Less good: Feel of a certain degree of transparency;
Poor: No feel of transparency.

Further, for quantitative transparency evaluation, the turbidity (haze) of each sheet obtained was measured according to JIS K 7105 using a turbidimeter (model NDH-300A, product of Nippon Denshoku Kogyo).

(4) Molecular Weight

Molecular weight measurements were carried out using a waters gel permeation chromatography (GPC) system (column: Showa Denko's Shodex K-804 (polystyrene gel), mobile phase: chloroform). Each average molecular weight was expressed on the polystyrene equivalent basis.

(5) Oxygen Permeability Coefficient

Samples with a thickness of about 1 mm were produced by compression molding of each resin composition for tubes at 170° C. These samples were submitted to oxygen permeability measurement according to JIS K 7126 at 23° C.

(6) Method of Wear Resistance Evaluation

The sheet surface of each pressed sheet obtained was rubbed with a No. 3 shirting "KANAKIN" (unbleached muslin or calico) cloth to and from 5 times under the conditions of load: 1 kg/cm$^2$ and travel distance: 50 mm using a surface property tester (HEIDON tester) (TYPE HEIDON 14DR, product of Shinto Scientific Co., Ltd.). The change in surface appearance after rubbing as compared with the surface before rubbing was evaluated by visual observation in the following five grades.
Excellent: No change at all;
Fine: Little change;
Fair: Occurrence of a small number of scratches;
Less good: Occurrence of a large number of scratches;
Poor: Sheet surface torn off.

PRODUCTION EXAMPLE 1

Production of Isobutylene Block Copolymer

A 500-mL separable flask polymerizer, after replacement of the inside atmosphere with nitrogen, was charged with 95.4 mL of n-hexane (dried over molecular sieves) and 135 mL of butyl chloride (dried over molecular sieves) using a syringe, and the polymerizer was cooled by immersion in a dry ice/methanol bath at −70° C. Then, a liquid feeding tube made of Teflon (registered trademark) was connected to a pressure-resistant glass-made liquefying and collecting tube equipped with a three-way cock and containing 54.4 mL (corresponding to 37.6 g, 576 mmol) of monomeric isobutylene and the monomeric isobutylene was fed to the polymerizer under nitrogen pressure. p-Dicumyl chloride (0.178 g, 0.77 mmol) and 0.132 g (1.42 mmol) of N,N'-dimethylacetamide were added. Then, the polymerization was initiated by further addition of 1.69 mL (15.44 mmol) of titanium tetrachloride. After 75 minutes of stirring following the start of polymerization, about 1 mL of the polymerization mixture was collected from the polymerization mixture for sampling. Then, 13.83 g (132.8 mmol) of monomeric styrene was added to the polymerizer. After the lapse of 45 minutes from the addition thereof, a large amount of water was added to terminate the reaction.

The reaction mixture was washed with two portions of water, the solvent was evaporated, and the polymer obtained was dried under vacuum at 60° C. for 24 hours. An isobutylene block copolymer (styrene-isobutylene-styrene triblock copolymer, SIBS) was thus obtained. This isobutylene block copolymer (SIBS) was analyzed by GPC. The weight average molecular weight of the polymer was 79,000, and the styrene content as determined by $^1$H-NMR was 29% by weight.

EXAMPLES 1 to 5 AND COMPARATIVE EXAMPLES 1 AND 2

The components (A), (B), (C), (D) and (E) each specified below were melt-kneaded together in the proportions shown in Table 1 using a laboratory plastomill (product of Toyo Seiki Kogyo) set at 190° C. Each blend was further fed to a twin-screw extruder (TEM-50; product of Toshiba Machine Co.), and a resin composition for tubes was obtained from a tube die attached to the tip of the extruder and subjected to extrudability evaluation. Then, test specimens were prepared therefrom and evaluated for various physical properties. The evaluation results thus obtained are shown in Table 1. The particulars of the respective components used and the abbreviations therefor are as shown below.

Component (A): Isobutylene Block Copolymer (Styrene-Isobutylene-Styrene Triblock Copolymer, Hereinafter Abbreviated as SIBS)

The product obtained in Production Example 1 as mentioned above.

Component (B): Thermoplastic Polyurethane Resin

Thermoplastic polyurethane (hereinafter abbreviated as TPU): ester type (adipate-diisocyanate addition polymer), product of DIC Bayer Polymer (product name: Pandex T-118), hardness 82 (JIS A)

Component (C): Functional Group-Containing Styrenic Polymer

Maleic anhydride-modified SEBS, product of Shell (product name: Kraton FG1901X), hardness 65 (JIS A).

Component (D): Lubricant: Product of Clariant Japan (Product Name: Licolub H4)

Component (E): Processing Aid: Product of Mitsubishi Rayon (Product Name: Metablen A3000, Acryl-Modified Polytetrafluoroethylene)

Component (B):

Thermoplastic polyurethane resin (hereinafter abbreviated as E385): ether type, product of Nippon Polyurethane Industries (product name: Miractran E385PNAT), hardness 85 (JIS A)

TABLE 1

|  |  | Example 1 | Example 2 | Example 3 | Example 4 | Example 5 | Compar. Ex. 1 | Compar. Ex. 2 |
|---|---|---|---|---|---|---|---|---|
| Component(A) | Isobutylene block copolymer | 40 | 40 | 40 | 30 | 20 |  | 100 |
| Component(B) | Thermoplastic polyurethane resin | 60 | 60 | 60 | 70 | 80 | 100 |  |
| Component(C) | Maleic anhydride-modified SEBS | 5 | 5 | 5 | 5 | 5 |  |  |
| Component(D) | Lubricant |  | 0.5 | 0.5 |  |  |  |  |
| Component(E) | Processing aid |  |  | 2 |  |  |  |  |
| Hardness | (JIS A) after 15 seconds | 67 | 67 | 69 | 72 | 74 | 82 | 45 |
| Tensile strength | (MPa) | 14.2 | 13.5 | 14.1 | 15.0 | 22.0 | 38.0 | 11.0 |
| Tensile elongation | (%) | 690 | 670 | 630 | 740 | 740 | 800 | 510 |
| Oxygen permeability | $(cm^2/sec/atm)$ | 3.27E-08 | 3.26E-08 | 3.26E-08 | 3.55E-08 | 3.84E-08 | 4.44E-08 | 1.46E-08 |
| Transparency | Visual observation | Fine | Fine | Fine | Less good | Less good | Fine | Fine |
|  | Turbidity(haze) | 20 | 23 | 27 | 35 | 38 | 16 | 10 |
| Wear resistance evaluation | HEIDON tester | Fair | Fine | Fine | Fine | Excellent | Excellent | Less good |
| Tube moldability | Appearance | Nearly smooth Transparent | Nearly smooth Transparent | Smooth Transparent | Nearly smooth Turbid | Nearly smooth Slightly turbid | Smooth Transparent | Surface roughening Transparent |
|  | Take-off characteristics | Fair | Fine | Excellent | Fair | Fair | Fine | Poor |

As is evident from comparison between Examples 1 to 5 and Comparative Examples 1 to 2, the samples of Examples 1 to 5 have appropriate levels of hardness, namely flexibility, and of wear resistance and are excellent in balance among tensile strength, tensile elongation, oxygen permeability, tube moldability and take-off characteristics. In particular, the samples of Examples 1 to 3 have transparency as well.

In view of the foregoing, the resin compositions for tubes according to the invention can be said to be resin compositions for tubes excellent in balance among wear resistance, flexibility, gar permeation resistance and low resilience (pliability) and can be suitably used in food packaging and in medical devices or instruments, among others.

EXAMPLES 6 to 8 AND COMPARATIVE EXAMPLES 3 AND 4

(Molding of Transfusion Tubes)

Transfusion tubes were formed using each resin composition for tubes in the following manner. The resin composition for tubes was obtained in the same manner as in Examples 1 to 5 and Comparative Examples 1 to 2 using the components (A) and (B) specified below in the proportions shown in Table 2. Then, the thus-obtained resin composition for tubes was fed to a single screw extruder (ø 25, product of Killion) and extruded through a tube die attached to the tip to give a single-layer transfusion tube with an outside diameter of 1.5 mm and an inside diameter of 1.0 mm. The transparency and flexibility features of the tube obtained were evaluated because of such features being requisites for the use thereof as a medical transfusion tube. The evaluation results are shown in Table 2. The particulars of the respective components used and the abbreviations therefor are as shown below.

Component (A): Isobutylene Block Copolymer (SIBS)

That produced in the above-mentioned Production Example.

Thermoplastic polyurethane resin for medical use (hereinafter abbreviated as MPU): ether type, product of Noveon (product name: Tecoflex E85A), hardness 85 (JIS A)

The physical properties of each transfusion tube were measured by the methods shown below.

(Tackiness)

The surface property tester mentioned above (HEIDON tester) was used. A PVC tube was vertically placed on the transfusion tube and the transfusion tube was moved by 10 cm at a rate of 300 mm/min under a load of 100 g under room temperature conditions (23° C., 50% RH), and the maximum load on that occasion was measured.

(Flexibility)

{Tensile Strength}

The transfusion tube was set on an Instron type universal tester over a chuck-to-chuck distance of 40 mm and stretched at a pulling rate of 100 mm/min under room temperature conditions (23° C., 50% RH) and the nominal stress at break was measured.

{Tube End Thrust Strength}

The transfusion tube was warmed by immersing in water at 37° C. for at least 30 minutes and then immediately set on a chuck of the above-mentioned Instron type universal tester under room temperature conditions so as to allow a 3-mm-long end portion of the tube to stick out from the chuck, the end portion was thrust by 1 mm into a silicone rubber sheet and the load on that occasion was measured. The testing speed was 5 mm/min.

(Tube Moldability)

The appearance of each tube obtained was evaluated by visual observation. As for the take-off characteristics, the extrudate molding flowing out of the tube die on the occasion of tube extrusion molding was evaluated for resistance to breaking upon pulling of the molten tube according to the criteria given below.

Fine: The molten tube flowing out from the tube die can be readily taken off and pulled via a water tank to the take-up mechanism; almost no breaking occurs immediately after flowing out from the tube die.

Less good: Care is needed in pulling the molten tube flowing out of the tube die but, if pulling is performed carefully, the tube can be pulled to the take-up mechanism without breaking just after flowing out from the tube die.

Poor: Unless pulling is performed with much care, the molten tube breaks immediately after flowing out from the tube die; pulling is thus difficult.

TABLE 2

|  |  | Example 6 | Example 7 | Example 8 | Compar. Ex. 3 | Compar. Ex. 4 |
|---|---|---|---|---|---|---|
| Component(A) | Isobutylene block copolymer | 30 | 50 | 30 |  | 100 |
| Component(B) | Thermoplastic polyurethane resin | E385 70 | E385 50 | MPU 70 | E385 100 |  |
| Tackiness | Surface friction load [g] | 140 | 197 | 135 | 116 | 320 |
| Flexibility | Tensile strength [MPa] | 25 | 14 | 28 | 33 | 3 |
|  | Tube end thrust strength [N] | 0.60 | 0.49 | 0.63 | 0.93 | 0.11 |
| Tube moldability | Appearance | Smooth Transparent | Nearly smooth Semi-transparent | Smooth Transparent | Smooth Transparent | Surface roughening Transparent |
|  | Take-off characteristics | Fine | Less good | Fine | Fine | Poor |

In the case of the transfusion tube made of the thermoplastic polyurethane resin alone, the tube moldability and tack behavior are satisfactory but the tensile strength and tube end thrust strength are high, hence the tube is disadvantageous in that the tube, as a transfusion tube, is lacking in flexibility, as revealed in Comparative Example 3. Further, as revealed in Comparative Example 4, the transfusion tube made of the isobutylene block copolymer alone is indeed excellent in flexibility but the tack behavior and tube moldability are markedly poor. On the contrary, in the case of the tubes made of the respective resin compositions for tubes as shown in Examples 6 to 8, it is seen that the respective disadvantages with respect to tackiness, flexibility and tube moldability are counterbalanced and well-balanced transfusion tubes are obtained.

In particular, the physical properties can be modified as desired by selecting the resin species to be formulated and the amounts thereof, as mentioned above. Therefore, when tubes made of the resin composition for tubes according to the invention are applied as tubes for intravascular transfusion, for instance, the drawback of thermoplastic polyurethane-made tubes which consists in a tendency toward damaging the blood vessel inside wall and the drawback of isobutylene block copolymer-made tubes which consists in poor insertability are respectively overcome and medical tubes having no such drawbacks can advantageously be obtained.

INDUSTRIAL APPLICABILITY

The resin composition for tubes according to the invention can be utilized in the fields of general manufacturing industries, automobile industry, medical and pharmaceutical industries and food industry. In particular, it can be properly used as a base material for food-transporting tubes, tubes for medical use or containers for medical use, which are required to have the flexibility (low hardness or rigidity), gas permeation resistance and transparency of a flexible resin layer. It is also very useful as an alternative material for thermoplastic polyurethane resins to serve as alternative materials for PVC and as an alternative material for plasticized polyvinyl chloride.

The tubes made of the resin composition for tubes according to the invention can be suitably used as tubes for medical use (e.g. transfusion tubes, catheters) and in the form of containers for medical use (e.g. blood bags).

The invention claimed is:

1. A resin composition for tubes, which comprises an isobutylene block copolymer (A) constituted of a polymer block (a) derived from isobutylene as a main constituent of the polymer block (a) and a polymer block (b) derived from a monomer component other than isobutylene as a main constituent of the polymer block (b), and a thermoplastic polyurethane resin (B).

2. The resin composition for tubes according to claim 1 wherein the isobutylene block copolymer (A) has a molecular weight of 50,000 to 200,000 and the polymer block (b) derived from a monomer component other than isobutylene as a main constituent of the polymer block (b) amounts to 10 to 40% by weight of the weight of the isobutylene block copolymer (A).

3. The resin composition for tubes according to claim 1 wherein the isobutylene block copolymer (A) is at least one species selected from the group consisting of a triblock copolymer, which is composed of a polymer block derived from an aromatic vinyl monomer as a main constituent thereof, a polymer block derived from isobutylene as a main constituent thereof, and a polymer block derived from an aromatic vinyl monomer as a main constituent thereof; a diblock copolymer, which is composed of a polymer block derived from an aromatic vinyl monomer as a main constituent thereof and a polymer block derived from isobutylene as a main constituent thereof; and a star block copolymer having at least three polymer chains comprising a polymer block derived from an aromatic vinyl monomer as a main constituent thereof and a polymer block derived from isobutylene as a main constituent thereof.

4. The resin composition for tubes according to claim 1, which further comprises 1 to 20 parts by weight, of polymer (C) comprising an olefin polymer or a styrene polymer containing at least one functional group species selected from the group consisting of an epoxy group, an amino group, a hydroxyl group, an acid anhydride group, a carboxyl group, a carboxyl acid salt, and a carboxylic acid ester group, relative to 100 parts by weight of a total of the isobutylene block copolymer (A) and thermoplastic polyurethane resin (B).

5. The resin composition for tubes according to claim 1, which further comprises 0.1 to 10 parts by weight of a lubricant (D) relative to 100 parts by weight of a total of the isobutylene block copolymer (A) and thermoplastic polyurethane resin (B).

6. The resin composition for tubes according to claim 1 which further comprises 0.1 to 10 parts by weight of a processing aid (E) relative to 100 parts by weight of a total of the isobutylene block copolymer (A) and thermoplastic polyurethane resin (B).

7. A tube made of the composition according to claim 1.

8. A transfusion tube made of the composition according to claim 1.

9. The resin composition for tubes according to claim 1 wherein the proportion of the isobutylene block copolymer (A) to the thermoplastic polyurethane resin (B), namely (A)/(B), is 10/90 to 90/10 by weight.

10. The resin composition for tubes according to claim 9 wherein the proportion of the isobutylene block copolymer (A) to the thermoplastic polyurethane resin (B), namely (A)/(B), is 10/90 to 50/50 by weight.

11. The resin composition for tubes according to claim 1 wherein the monomer component constituting the polymer block (b) is an aromatic vinyl monomer.

12. The resin composition for tubes according to claim 11 wherein the aromatic vinyl monomer is at least one species selected from the group consisting of styrene, p-methylstyrene, α-methylstyrene and indene.

\* \* \* \* \*